United States Patent
Smith et al.

(10) Patent No.: US 9,519,441 B1
(45) Date of Patent: Dec. 13, 2016

(54) AUTOMATED STORAGE PROVISIONING AND MANAGEMENT USING A CENTRALIZED DATABASE

(71) Applicant: EMC Corporation, Hopkinton, MA (US)

(72) Inventors: Aaron T. Smith, Sudbury, MA (US); Edward Brennan, Scituate, MA (US); Keith Meyer, Southborough, MA (US); Adnan Sahin, Needham, MA (US); Mark Nadler, Westborough, MA (US); John O. Williams, II, Florence, KY (US); Jesse D. Keefe, Florence, KY (US)

(73) Assignee: EMC IP Holding Company LLC, Hopkinton, MA (US)

( * ) Notice: Subject to any disclaimer, the term of this patent is extended or adjusted under 35 U.S.C. 154(b) by 216 days.

(21) Appl. No.: 13/632,055

(22) Filed: Sep. 30, 2012

(51) Int. Cl.
  *G06F 12/00* (2006.01)
  *G06F 3/06* (2006.01)
(52) U.S. Cl.
  CPC ............ *G06F 3/067* (2013.01); *G06F 3/0631* (2013.01)
(58) Field of Classification Search
  None
  See application file for complete search history.

(56) References Cited

U.S. PATENT DOCUMENTS

| | | | |
|---|---|---|---|
| 7,818,517 B1 | 10/2010 | Glade et al. | |
| 7,930,476 B1* | 4/2011 | Castelli et al. | 711/114 |
| 2005/0154769 A1 | 7/2005 | Eckart et al. | |
| 2007/0156670 A1 | 7/2007 | Lim | |
| 2007/0214338 A1* | 9/2007 | Mizuno et al. | 711/170 |
| 2009/0210427 A1 | 8/2009 | Eidler et al. | |
| 2012/0240110 A1 | 9/2012 | Breitgand et al. | |
| 2012/0254269 A1 | 10/2012 | Carmichael | |
| 2013/0179657 A1* | 7/2013 | Isomura et al. | 711/165 |

* cited by examiner

*Primary Examiner* — Baboucarr Faal
(74) *Attorney, Agent, or Firm* — Ryan, Mason & Lewis, LLP

(57) ABSTRACT

An information processing system comprises a centralized database and at least one processing device implementing a selection algorithm for automated provisioning and management of a plurality of storage arrays based on information collected from the storage arrays and stored in the centralized database. The information stored in the centralized database may comprise at least one of storage utilization, performance, network bandwidth and end of service for each of the storage arrays. The selection algorithm is configured to determine optimal placement of data across the storage arrays based on the information stored in the centralized database. For example, the selection algorithm may be configured to determine one or more locations within the plurality of storage arrays to allocate as new storage responsive to a provisioning request.

20 Claims, 5 Drawing Sheets

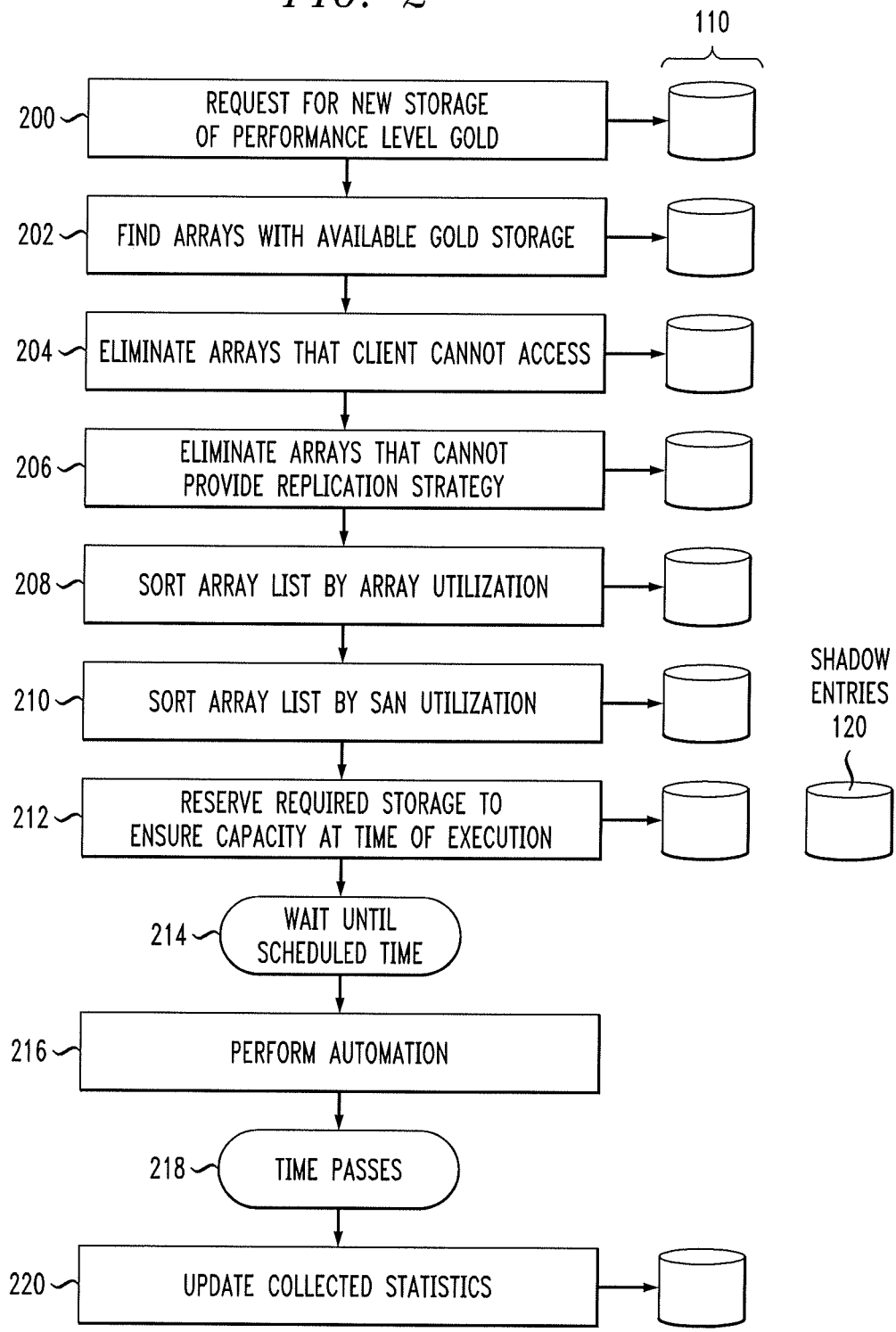

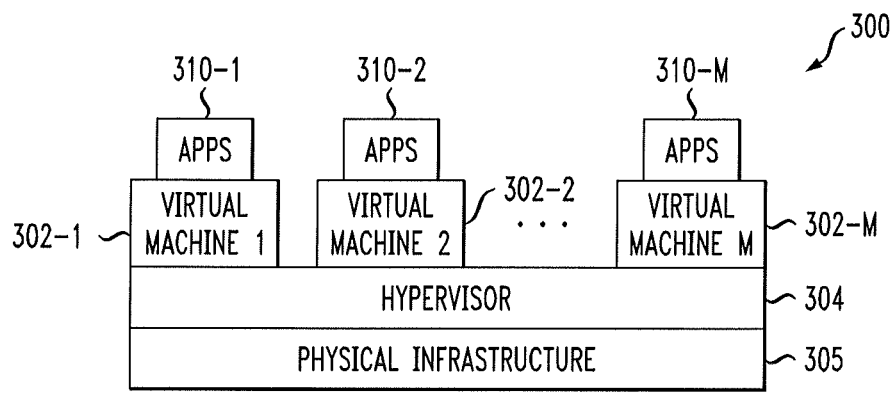
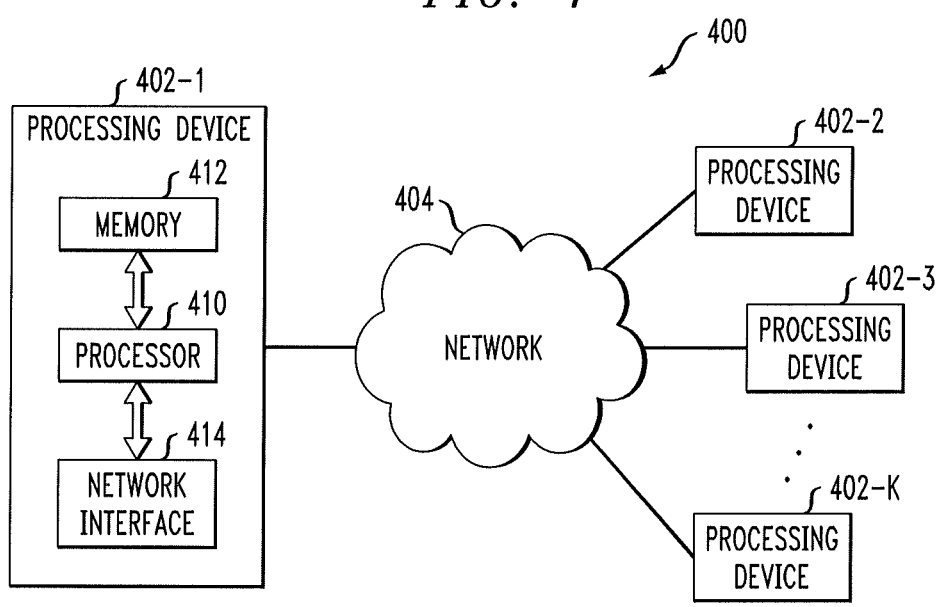

AUTOMATED STORAGE PROVISIONING AND MANAGEMENT USING A CENTRALIZED DATABASE

FIELD

The field relates generally to information processing systems, and more particularly to storage provisioning and management.

BACKGROUND

In information technology (IT) infrastructure, storage systems may be deployed by respective service providers, each providing storage services to multiple tenants. The IT infrastructure used to implement such storage systems may comprise multiple storage arrays and associated processing platforms, including processing platforms comprising distributed virtual infrastructure or other types of cloud infrastructure. Relative to a given company, organization or other enterprise, such service provider storage systems may be internal or external. An example of an internal service provider storage system may comprise an IT group of an enterprise that acts as a service provider to enterprise users. External service providers may comprise entities that are otherwise unrelated to the enterprise but nonetheless provide storage services to the enterprise users.

Arrangements of this type can be problematic in that there is typically little or no global control provided across the IT infrastructure resources used to implement the multiple storage systems of the various service providers. Instead, it is common for each service provider storage system to be separately provisioned and managed locally, without regard to the storage systems of other service providers sharing the IT infrastructure. Moreover, such localized provisioning and management is often insufficiently automated, and therefore relies heavily on labor-intensive manual oversight by administrative personnel.

It is therefore apparent that a need exists for improved techniques for provisioning and management of storage systems in IT infrastructure.

SUMMARY

Embodiments of the present invention provide improved techniques for storage provisioning and management in cloud infrastructure and other types of IT infrastructure. These embodiments can provide centralized and fully automated control of storage provisioning and management across multiple storage arrays in one or more service provider storage systems or other types of storage systems.

In one embodiment, an information processing system comprises a centralized database and at least one processing device implementing a selection algorithm for automated provisioning and management of a plurality of storage arrays based on information collected from the storage arrays and stored in the centralized database. The information stored in the centralized database may comprise at least one of storage utilization, performance, network bandwidth and end of service for each of the storage arrays. The selection algorithm is configured to determine optimal placement of data across the storage arrays based on the information stored in the centralized database. For example, the selection algorithm may be configured to determine one or more locations within the plurality of storage arrays to allocate as new storage responsive to a provisioning request.

The processing device may implement a collection mechanism for controlling collection of the information from the storage arrays for storage in the centralized database by periodically capturing a current state of each storage array in terms of one or more of configuration, storage utilization and performance.

One or more of the illustrative embodiments described herein exhibit improved performance relative to conventional arrangements in the provisioning and management of storage systems. For example, the disclosed arrangements can be used to ensure that data is optimally distributed across multiple storage arrays having different pools of available storage resources at each of a plurality of performance levels.

BRIEF DESCRIPTION OF THE DRAWINGS

FIG. 2 is a flow diagram of a process for automated provisioning using a centralized database in the system of FIG. 1.

FIGS. 3 and 4 show examples of processing platforms that may be utilized to implement at least a portion of the FIG. 1 system.

DETAILED DESCRIPTION

Illustrative embodiments of the present invention will be described herein with reference to exemplary information processing systems and associated computers, servers, storage devices and other processing devices. It is to be appreciated, however, that the invention is not restricted to use with the particular illustrative system and device configurations shown. Accordingly, the term "information processing system" as used herein is intended to be broadly construed, so as to encompass, for example, processing systems comprising private or public cloud computing or storage systems, as well as other types of processing systems comprising physical or virtual processing resources in any combination.

Figure 1:
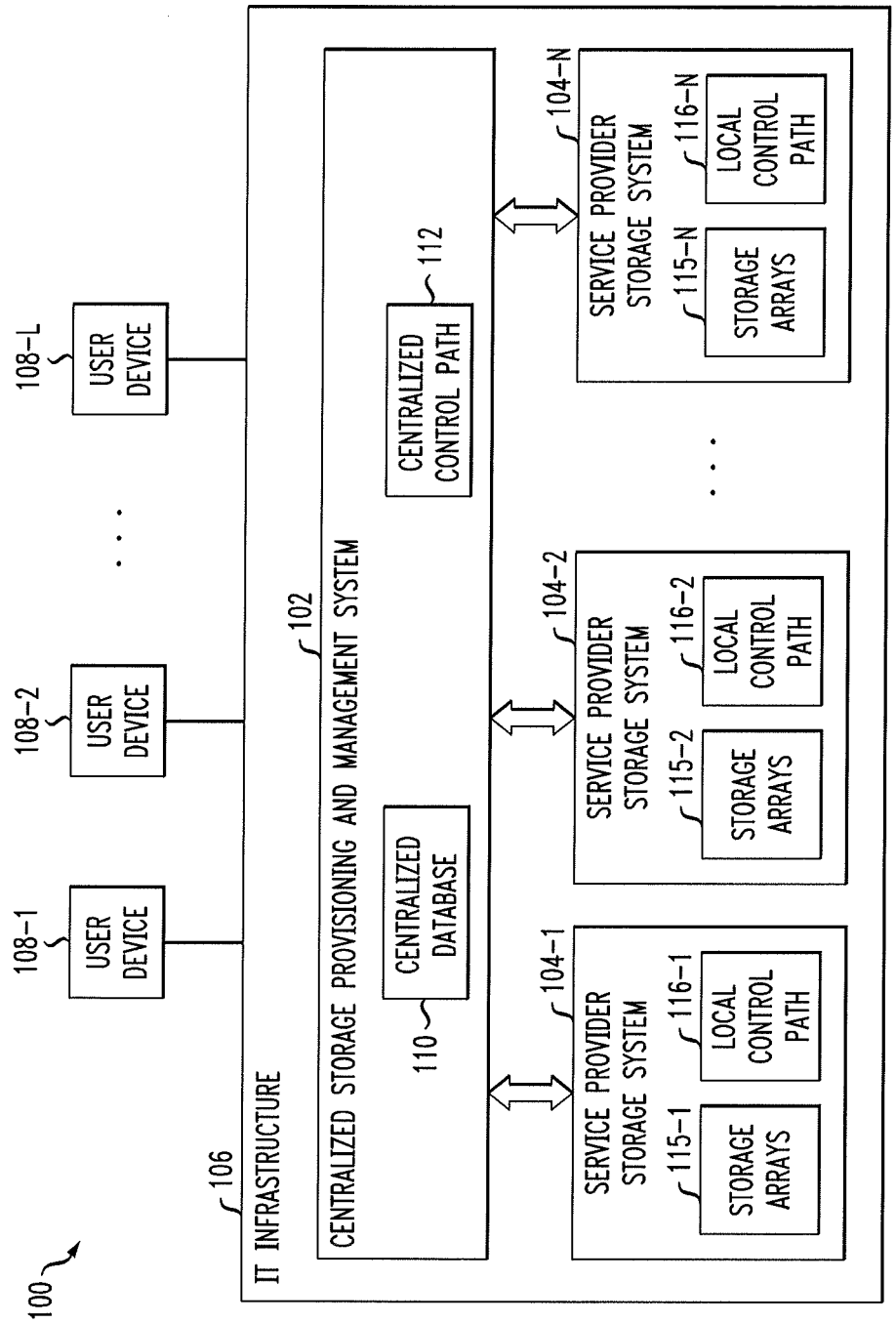
FIG. 1 is a block diagram of information processing system in an embodiment of the invention.

FIG. 1 shows an information processing system 100 configured in accordance with an illustrative embodiment of the present invention. The information processing system 100 comprises a centralized storage provisioning and management system 102 coupled to a plurality of service provider storage systems 104-1, 104-2, . . . 104-N. The centralized storage provisioning and management system 102 is configured to control provisioning and management of the service provider storage systems 104 utilizing information collected from the service provider storage systems. By way of example, the service provider storage systems 104 may comprise respective service provider data centers, while the centralized storage provisioning and management system 102 may comprise an additional data center separate from the service provider data centers 104. The functionality of the centralized storage provisioning and management system 102 may be provided to the service provider storage systems 104 on a software-as-a-service basis.

The service provider storage systems 104 are implemented with the centralized storage provisioning and management system 102 in a common set of IT infrastructure 106 comprising one or more processing platforms. The IT infrastructure 106 or portions thereof may be implemented using one or more processing devices of a processing platform. Examples of processing platforms that may form portions of the IT infrastructure 106 in system 100 will be described in more detail below in conjunction with FIGS. 3 and 4.

User devices 108-1, 108-2, . . . 108-L utilize storage services provided by the various service provider storage systems 104 implemented in the IT infrastructure 106. The user devices 108 may be configured to allow their corresponding users to access the IT infrastructure 106 via connections established over a network. Such a network, although not expressly illustrated in FIG. 1, may comprise, for example, a global computer network such as the Internet, a wide area network (WAN), a local area network (LAN), a satellite network, a telephone or cable network, a cellular network, a wireless network such as WiFi or WiMAX, or various portions or combinations of these and other types of networks.

A given one of the user devices 108 in the system 100 may be associated with a single user, or multiple users may be associated with a single device. The term "user" as utilized herein is intended to be broadly construed so as to encompass, for example, a human user associated with a given device or set of devices, an automated user such as an application or other hardware or software component associated with a given device, or any other entity that may control that device.

The centralized storage provisioning and management system 102 comprises a centralized database 110 and a centralized control path 112 implemented apart from the service provider storage systems 104. The centralized control path 112 operates in conjunction with the centralized database 110 using information stored in that database and characterizing various aspects of the service provider storage systems 104. For example, the centralized database 110 in the present embodiment stores configuration information, resource usage information, provider-to-resource mapping information, and performance information regarding each of the service provider storage systems 104.

In the present embodiment, the service provider storage systems 104-1, 104-2, . . . 104-N comprise respective storage arrays 115-1, 115-2, . . . 115-N associated with respective localized control paths 116-1, 116-2, . . . 116-N.

By way of example, the storage arrays 115 may comprise storage products such as VNX and Symmetrix VMAX, both commercially available from EMC Corporation of Hopkinton, Mass. A variety of other storage products may be utilized to implement portions of the IT infrastructure 106.

The localized control paths 116 are also referred to herein as local control paths. The centralized control path 112 is configured to interact with the localized control paths 116 implemented in respective ones of the service provider storage systems 104. The centralized control path 112 manages the localized control paths 116 which in turn interface with the respective storage arrays 115.

In the present embodiment, the centralized storage provisioning and management system 102 implements at least one selection algorithm for automated provisioning and management of the storage arrays 115 based on information collected from the storage arrays via the control paths 112 and 116 and stored in the centralized database 110. For example, a given selection algorithm implemented by the centralized storage provisioning and management system 102 may be configured to determine optimal placement of data across the storage arrays 115 based on the information stored in the centralized database 110. Accordingly, the selection algorithm may be configured to determine one or more locations within the storage arrays 115 to allocate as new storage responsive to provisioning requests, or to implement similar functionality relating to centralized provisioning and management. Examples of selection algorithms suitable for use in embodiments of the invention will be described in greater detail below in conjunction with FIGS. 2, 5 and 6.

The user devices 108 and portions of the centralized storage provisioning and management system 102 and service provider storage systems 104 may be implemented using a variety of different arrangements of what are generally referred to herein as "processing devices." A given such processing device generally comprises at least one processor and an associated memory, and implements one or more functional modules for controlling certain features of the system 100.

The processor in a given processing device of system 100 may comprise a microprocessor, a microcontroller, an application-specific integrated circuit (ASIC), a field-programmable gate array (FPGA) or other type of processing circuitry, as well as portions or combinations of such circuitry elements.

The memory may comprise random access memory (RAM), read-only memory (ROM) or other types of memory, in any combination. The memory and other memories disclosed herein may be viewed as examples of what are more generally referred to as "computer program products" storing executable computer program code.

In addition to a processor and a memory, a processing device will generally include a variety of other types of circuitry, such as network interface circuitry that allows the processing device to communicate with other processing devices over one or more networks. The network interface circuitry may comprise one or more conventional transceivers.

The centralized database 110, centralized control path 112 and localized control paths 116 may be implemented at least in part in the form of software that is stored and executed by respective memory and processor elements of one or more processing devices. Accordingly, as indicated previously, system elements such as elements 102, 104, 106 and 108 may therefore be implemented using one or more processing platforms each comprising multiple processing devices. Such processing platforms may comprise cloud infrastructure of a cloud service provider.

The system 100 in the present embodiment implements one or more processes to provide centralized storage provisioning and management for the service provider storage systems 104 of the IT infrastructure 102. An example of such a process will be described below in conjunction with FIG. 2, but it is to be appreciated that numerous other types of processes may be used in other embodiments.

It is to be appreciated that the particular set of elements shown in FIG. 1 for providing centralized storage provisioning and management for multiple service provider storage systems 104 in IT infrastructure 106 is presented by way of example, and in other embodiments additional or alternative elements may be used.

For example, although illustrated in the context of multiple service provider storage systems, techniques disclosed herein can be adapted in a straightforward manner for use with a single server provider storage system, or for use with other types of storage systems not necessarily associated with one or more service providers.

The operation of the system 100 will now be described in greater detail with reference to the flow diagram of FIG. 2, which illustrates a set of operations performed by the IT infrastructure 106 in an illustrative embodiment. The process as shown includes steps 200 through 220. The steps may be performed by at least one processing device that includes a processor coupled to a memory and is implemented in one or more processing platforms of the IT infrastructure 106.

Each of the steps in this embodiment involves interaction with the centralized database 110 of the centralized storage provisioning and management system 102, as indicated generally at the right side of each step in the figure, and certain steps such as step 212 also involve interaction with shadow entries in a shadow database 120.

In step 200, a request is received for storage resources at a particular performance level. It will be assumed for this embodiment and one or more other embodiments described herein that the system 100 supports multiple performance levels that include gold, silver and bronze performance levels, although other numbers and types of performance levels can be used. The performance levels can be specified in terms of a wide variety of different parameters, such as input-output operations per second (IOPS), latency, etc. The request received in step 200 is assumed to be for new storage at the gold performance level.

In step 202, one or more storage arrays having storage resources available at the gold performance level are identified.

In step 204, any of the storage arrays identified in step 202 that the particular requesting client cannot access are eliminated from consideration.

In step 206, any of the storage arrays remaining after the elimination of step 204 that cannot provide a designated replication strategy associated with the requesting client are also eliminated from consideration.

In step 208, the remaining identified storage arrays are sorted into a list based on array utilization.

In step 210, the remaining identified storage arrays are sorted into a list based on storage area network (SAN) utilization.

In step 212, the lists resulting from the respective sorting steps 208 and 210 are utilized to reserve an amount of storage in one or more of the storage arrays as required in order to satisfy the request. More particularly, in the present embodiment this involves reserving required storage for a particular scheduled execution time. As indicated above, this process may involve utilizing shadow entries from a shadow database 120 that is maintained in association with the centralized database 110.

In step 214, the process waits until the scheduled time referred to in step 212.

In step 216, automation is performed in order to allocate the reserved storage resources. This automation generally comprises one or more automated provisioning operations, and serves to automatically configure one or more of the storage arrays to provide the reserved amount of storage at the scheduled time.

In step 218, additional time passes during which the requesting client is utilizing the allocated storage resources.

In step 220, previously-collected statistics from the centralized database 110 relating to the storage resources are updated to reflect the latest usage patterns.

Collection of information for storage in the centralized database 110 may involve use of a collection mechanism which may utilize the control paths 112 and 116. An exemplary such control mechanism may be implemented at least in part in the form of software and may be configured for controlling collection of the information from the storage arrays 115 for storage in the centralized database 110 by periodically capturing a current state of each of the storage arrays in terms of one or more of configuration, storage utilization and performance. Other characteristics of the storage arrays and their various operations may be collected in this manner, as required in a given embodiment. The information stored in the centralized database 110 may comprise, for example, configuration information for each of the storage arrays 115 and any associated SAN switches.

As a more particular example, the information stored in the centralized database 110 may include information such as storage utilization, performance, network bandwidth and end of service indicators for each of the storage arrays 115 of the IT infrastructure 106. In such an arrangement, the shadow database 120 associated with the centralized database 110 may be configured to store historical information relating to storage utilization, performance, network bandwidth and end of service for each of the storage arrays.

The end of service indicators for the storage arrays will generally indicate the expected lifespan of those arrays. The selection algorithm can be advantageously configured to take such end of service information into account in order to ensure that the provisioned storage timeframe will not exceed the expected lifetime of any of the selected storage arrays, thereby avoiding the need for later data migration.

In some embodiments, the service provider storage systems 104 may be configured to provide no local provisioning and management functionality for their associated storage arrays 115, other than that provided under direct control of the centralized storage provisioning and management system 102. This allows the service provider storage systems 104 to essentially offload all of their storage provisioning and management functionality to the centralized storage provisioning and management system 102. In such arrangements, all provisioning and management requests relating to the service provider storage systems 104 are passed through the centralized system 102.

In order to facilitate centralized control of the service provider storage systems 104, the centralized storage provisioning and management system 102 may be configured to associate user identifiers with respective tenants of each of the service provider storage systems 104 and to control user access to those storage systems in a manner that allows the centralized storage provisioning and management system 102 to more accurately track resource usage by the service provider storage systems 104. Such an arrangement facilitates the implementation of chargebacks and trending. In addition, the centralized storage provisioning and management system 102 can be configured to require users to login with appropriate credentials and access privileges.

The particular processing operations and other system functionality described in conjunction with the flow diagram of FIG. 2 are presented by way of illustrative example only, and should not be construed as limiting the scope of the invention in any way. Alternative embodiments can use other types of processing operations for providing centralized storage provisioning and management for multiple service provider storage systems.

For example, the ordering of the process steps may be varied in other embodiments, or certain steps may be performed concurrently with one another rather than serially. Also, one or more of the process steps may be repeated periodically or on an as-needed basis responsive to particular events. As mentioned above, the steps of the FIG. 2 process are assumed to be implemented in a processing platform comprising at least one processing device having a processor coupled to a memory.

It is to be appreciated that centralized storage provisioning and management functionality such as that described in conjunction with the flow diagram of FIG. 2 can be implemented at least in part in the form of one or more software programs stored in memory and executed by a processor of a processing device such as a computer or server. As mentioned previously, a memory or other storage device having such program code embodied therein is an example of what is more generally referred to herein as a "computer program product."

The embodiments described in conjunction with FIGS. 1 and 2 can provide a number of significant advantages relative to conventional practice. For example, a given such embodiment can be configured to ensure that the service provider storage systems 104 are deployed in an optimal manner across the resources of the IT infrastructure 106. The storage provisioning and management is fully automated and policy driven, resulting in a significantly improved allocation of system resources. Moreover, these arrangements allow storage provisioning and management to be provided to the service provider storage systems using a software-as-a-service model.

As indicated above, the disclosed techniques can also provide significant advantages outside of the context of service provider storage systems. More generally, a wide variety of other types of storage systems can be benefit by the automated provisioning and management functionality achieved by utilizing the centralized database 110 in conjunction with one or more selection algorithms to determine optimal placement of storage across multiple storage arrays or portions thereof, thereby reducing the cost and complexity associated with implementation and maintenance of storage systems.

Referring now to FIG. 3, portions of the information processing system 100 in this embodiment comprise cloud infrastructure 300. The cloud infrastructure 300 comprises virtual machines (VMs) 302-1, 302-2, . . . 302-M implemented using a hypervisor 304. The hypervisor 304 runs on physical infrastructure 305. The cloud infrastructure 300 further comprises sets of applications 310-1, 310-2, . . . 310-M running on respective ones of the virtual machines 302-1, 302-2, . . . 302-M under the control of the hypervisor 304.

Although only a single hypervisor 304 is shown in the embodiment of FIG. 3, the system 100 may of course include multiple hypervisors each providing a set of virtual machines using at least one underlying physical machine.

An example of a commercially available hypervisor platform that may be used to implement hypervisor 304 and possibly other portions of the cloud infrastructure 300 of information processing system 100 in one or more embodiments of the invention is the VMware® vSphere™ which may have an associated virtual infrastructure management system such as the VMware® vCenter™.

As indicated previously, the system 100 may be implemented using one or more processing platforms. One or more of the processing modules or other components of system 100 may therefore each run on a computer, server, storage device or other processing platform element. A given such element may be viewed as an example of what is more generally referred to herein as a "processing device." The cloud infrastructure 300 shown in FIG. 3 may represent at least a portion of one processing platform. Another example of such a processing platform is processing platform 400 shown in FIG. 4.

The processing platform 400 in this embodiment comprises a portion of the system 100 and includes a plurality of processing devices, denoted 402-1, 402-2, 402-3, . . . 402-K, which communicate with one another over a network 404.

The network 404 may comprise any type of network, such as a WAN, a LAN, a satellite network, a telephone or cable network, or various portions or combinations of these and other types of networks.

The processing device 402-1 in the processing platform 400 comprises a processor 410 coupled to a memory 412. The processor 410 may comprise a microprocessor, a microcontroller, an ASIC, an FPGA or other type of processing circuitry, as well as portions or combinations of such circuitry elements, and the memory 412, which may be viewed as an example of a "computer program product" having executable computer program code embodied therein, may comprise RAM, ROM or other types of memory, in any combination.

Also included in the processing device 402-1 is network interface circuitry 414, which is used to interface the processing device with the network 404 and other system components, and may comprise conventional transceivers.

The other processing devices 402 of the processing platform 400 are assumed to be configured in a manner similar to that shown for processing device 402-1 in the figure.

Again, the particular processing platform 400 shown in the figure is presented by way of example only, and system 100 may include additional or alternative processing platforms, as well as numerous distinct processing platforms in any combination, with each such platform comprising one or more computers, servers, storage devices or other processing devices.

Multiple elements of information processing system 100 may be collectively implemented on a common processing platform of the type shown in FIG. 3 or 4, or each such element may be implemented on a separate processing platform.

Figure 5:
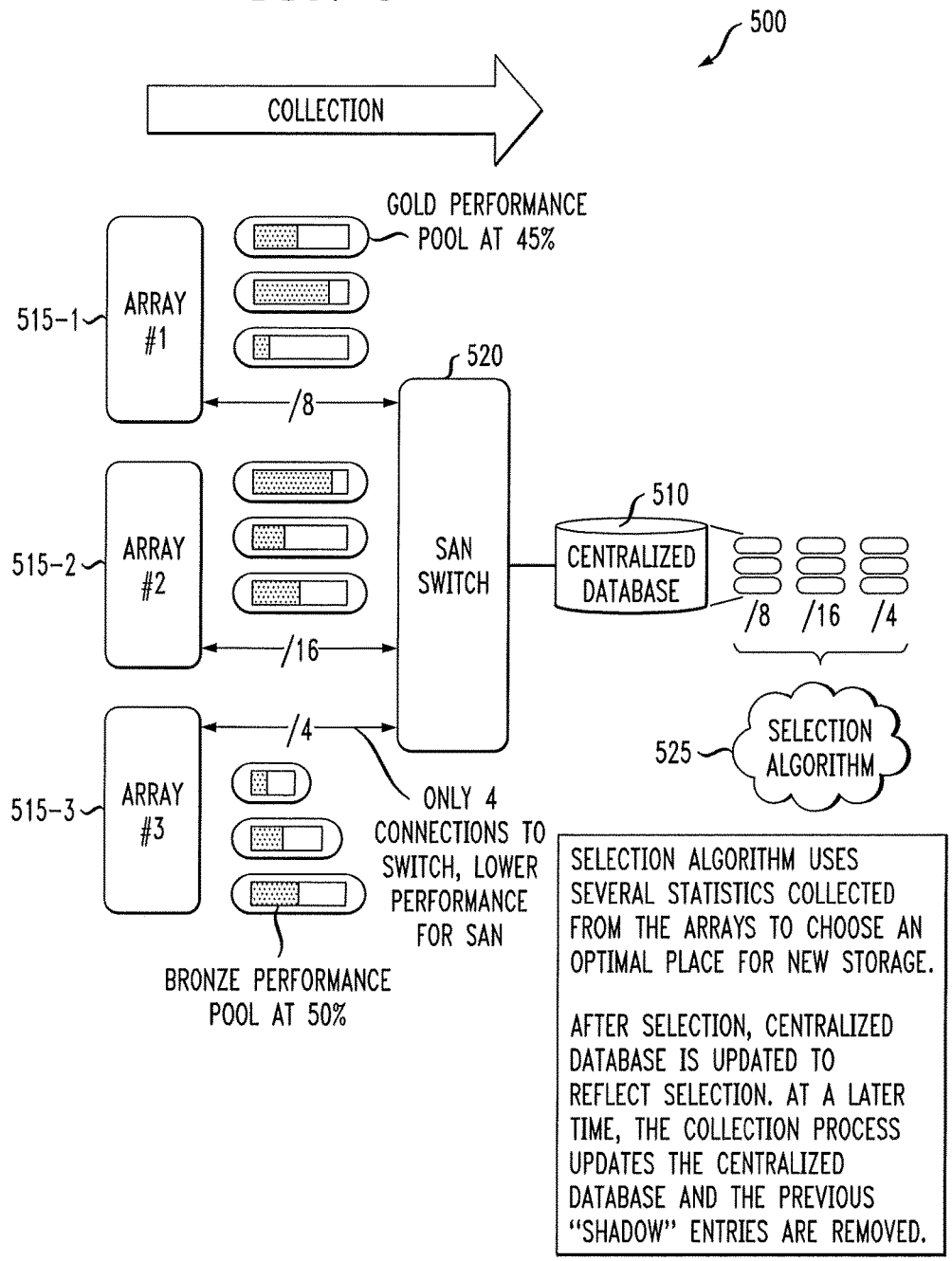
FIGS. 5 and 6 show portions of an information processing system in other embodiments of the invention.
Figure 6:
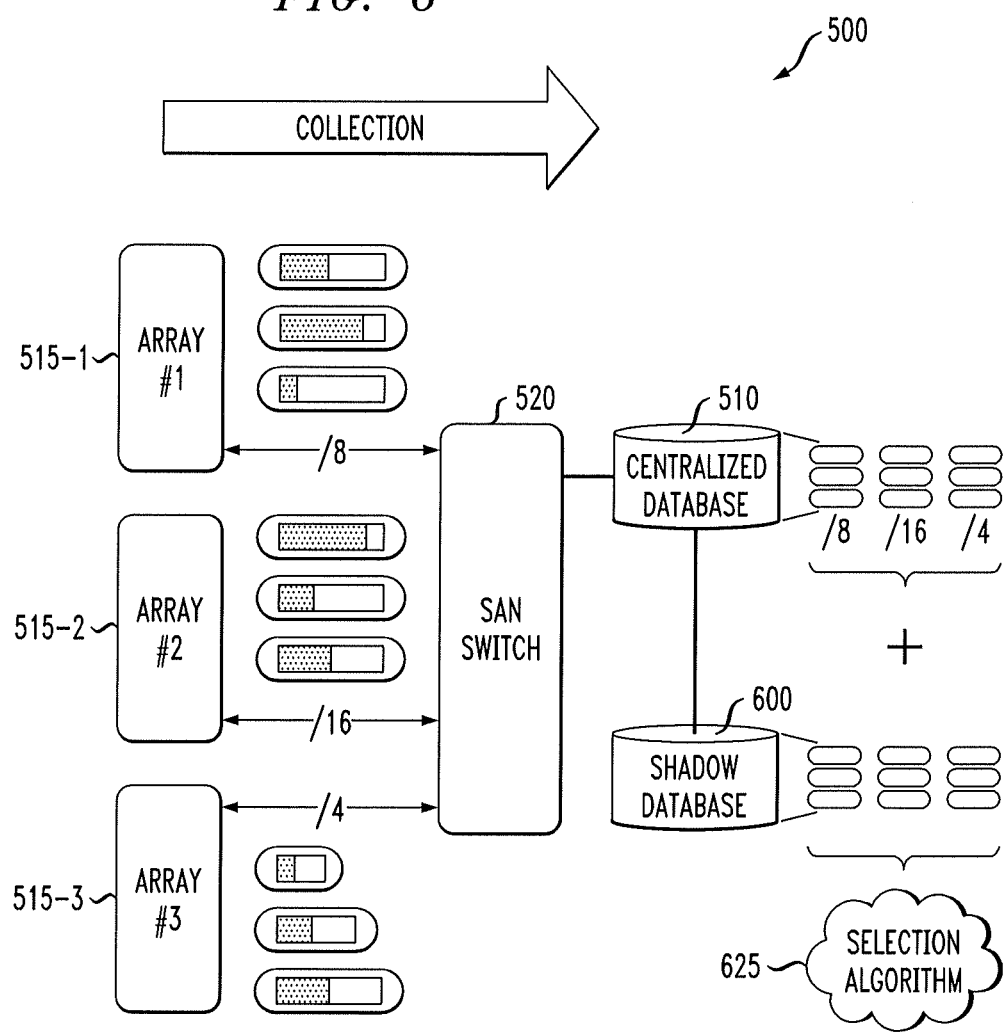

Referring now to FIGS. 5 and 6, additional illustrative embodiments of the present invention will be described.

In the FIG. 5 embodiment, an information processing system 500 comprises a centralized database 510, three storage arrays 515-1, 515-2 and 515-3, a SAN switch 520, and a selection algorithm 525. The selection algorithm 525 is implemented on at least one processing device, which is not expressly shown in the figure. In this embodiment, each of the storage arrays 515 maintains pools of storage resources for respective performance levels, illustratively gold, silver and bronze performance levels.

The different pools in each of the storage arrays 515 contain different amounts of storage resources, and have occupancy levels which vary dynamically over time. Thus, as illustrated in the figure, the gold performance pool for storage array 515-1 is at 45% occupancy level, while the bronze performance pool for storage array 515-3 is at 50% occupancy level. Also, in this embodiment the various storage arrays 515 have different numbers of connections to the SAN switch 520. More particularly, the storage arrays 515-1, 515-2 and 515-3 have 8, 16 and 4 connections, respectively, to the SAN switch 520.

The selection algorithm 525 makes use of several statistics collected from the storage arrays 515, including information relating to the occupancy levels and number of SAN connections, in order to choose an optimal placement for new storage. After selection, the centralized database 510 is updated to reflect the selection. At a later time, the collection mechanism previously described herein is utilized to update the centralized database 510 such that any associated shadow entries in a shadow database can be removed.

FIG. 6 illustrates an arrangement involving a shadow database 600. In this embodiment, the selection algorithm 625 is configured to use a combination of the statistics referred to in the FIG. 5 embodiment as well as data from the shadow database 600 in making decisions regarding selection of storage resources. The shadow database may be implemented in the form of one or more shadow tables arranged within or otherwise associated with the centralized database 510. The use of a shadow database helps to reduce the overhead associated with gathering of configuration information.

It should again be emphasized that the above-described embodiments of the invention are presented for purposes of illustration only. Many variations and other alternative embodiments may be used. For example, the disclosed techniques are applicable to a wide variety of other types of information processing systems, processing platform and processing device configurations, centralized databases, centralized and localized control paths, and service provider storage systems. Accordingly, the particular configuration of system and device elements shown in FIGS. 1 and 3-6, and the process shown in FIG. 2, can be varied in other embodiments. Moreover, any assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
   a centralized database; and
   at least one processing device implementing a selection algorithm for automated provisioning and management of a plurality of storage arrays based on information collected from the storage arrays and stored in the centralized database;
   wherein the storage arrays are associated with respective storage systems, each of the storage systems being associated with a different service provider, each service provider having multiple tenants; and
   wherein the centralized database is implemented in a centralized storage provisioning and management system configured to control provisioning and management of the service provider storage systems utilizing information collected from the service provider storage systems, the centralized storage provisioning and management system being further configured to associate user identifiers with respective tenants of each of the service providers and to control user access to the storage systems associated with the different service providers in a manner that allows the centralized storage provisioning and management system to track resource usage;
   the centralized storage provisioning and management system comprising a centralized control path implemented apart from the service provider storage systems and a plurality of localized control paths implemented in respective ones of the service provider storage systems; and
   the centralized storage provisioning and management system providing storage provisioning and management functionality for the different service providers in accordance with a software-as-a-service model in which the centralized storage provisioning and management system exclusively controls provisioning and management of the storage arrays associated with the respective service provider storage systems;
   wherein the service provider storage systems offload local provisioning and management functionality to the centralized storage provisioning and management system; and
   wherein responsive to the storage arrays having different numbers of connections to one or more storage area network switches, the selection algorithm utilizes information relating to occupancy levels of the storage arrays and the numbers of connections to the storage area network switches to choose placement for new storage.

2. The apparatus of claim 1 wherein the selection algorithm is configured to determine optimal placement of data across the storage arrays based on the information stored in the centralized database.

3. The apparatus of claim 1 wherein the selection algorithm is configured to determine one or more locations within the plurality of storage arrays to allocate as new storage responsive to a provisioning request.

4. The apparatus of claim 1 wherein said at least one processing device implements a collection mechanism for controlling collection of the information from the storage arrays for storage in the centralized database by periodically capturing a current state of each storage array in terms of one or more of configuration, storage utilization and performance.

5. The apparatus of claim 1 wherein the information stored in the centralized database comprises configuration information for each of the storage arrays and any associated storage area network switches.

6. The apparatus of claim 1 wherein the information stored in the centralized database comprises at least one of storage utilization, performance, network bandwidth and end of service for each of the storage arrays.

7. The apparatus of claim 1 wherein each of the storage arrays maintains a pool of available storage resources at each of a plurality of performance levels and the information stored in the centralized database comprises information relating to current state of the pools of available storage resources for each of the storage arrays.

8. The apparatus of claim 7 wherein the selection algorithm is configured to determine optimal placement of data across the storage arrays based on said information relating to current state of the pools of available storage resources for each of the storage arrays.

9. The apparatus of claim 1 further comprising a shadow database associated with the centralized database and storing historical information relating to at least one of storage utilization, performance, network bandwidth and end of service for each of the storage arrays.

10. The apparatus of claim 1 wherein said at least one processing device implements functionality for automated replication operations spanning multiple ones of the storage arrays based on configuration information collected from the storage arrays and stored in the centralized database.

11. An information processing system comprising at least one processing platform which incorporates the apparatus of claim 1.

12. A method comprising:
    collecting information from a plurality of storage arrays, the storage arrays being associated with respective storage systems, each of the storage systems being associated with a different service provider, each service provider having multiple tenants;
    storing the information in a centralized database; and
    implementing a selection algorithm for automated provisioning and management of the plurality of storage arrays based on information collected from the storage arrays and stored in the centralized database;

wherein the centralized database is implemented in a centralized storage provisioning and management system configured to control provisioning and management of the service provider storage systems utilizing information collected from the service provider storage systems, the centralized storage provisioning and management system being further configured to associate user identifiers with respective tenants of each of the service providers and to control user access to the storage systems associated with the different service providers in a manner that allows the centralized storage provisioning and management system to track resource usage;

the centralized storage provisioning and management system comprising a centralized control path implemented apart from the service provider storage systems and a plurality of localized control paths implemented in respective ones of the service provider storage systems; and the centralized storage provisioning and management system providing storage provisioning and management functionality for the different service providers in accordance with a software-as-a-service model in which the centralized storage provisioning and management system exclusively controls provisioning and management of the storage arrays associated with the respective service provider storage systems;

wherein the service provider storage systems offload local provisioning and management functionality to the centralized storage provisioning and management system; and wherein responsive to the storage arrays having different numbers of connections to one or more storage area network switches, the selection algorithm utilizes information relating to occupancy levels of the storage arrays and the numbers of connections to the storage area network switches to choose placement for new storage.

13. The method of claim 12 wherein said collecting, storing and implementing are performed by at least one processing device having a processor coupled to a memory.

14. The method of claim 12 further comprising:
receiving a request from a client for storage resources at a particular performance level;
identifying at least a subset of the storage arrays having storage resources available at the particular performance level;
eliminating from consideration any of the identified storage arrays not accessible by the client;
sorting remaining identified storage arrays based on one or more designated utilization measures; and
selecting one or more of the arrays based at least in part on a result of the sorting.

15. The method of claim 14 wherein the one or more designated utilization measures comprise one or more of array utilization and storage area network utilization.

16. The method of claim 12 further comprising:
receiving a request from a client for storage resources;
reserving an amount of storage in one or more of the storage arrays as required to satisfy the request; and
automatically configuring said one or more storage arrays to provide the reserved amount of storage at a scheduled time.

17. A computer program product comprising a non-transitory processor-readable storage medium having encoded therein executable code of one or more software programs, wherein the one or more software programs when executed in information technology infrastructure cause the information technology infrastructure:

to collect information from a plurality of storage arrays, the storage arrays being associated with respective storage systems, each of the storage systems being associated with a different service provider, each service provider having multiple tenants;

to store the information in a centralized database; and to implement a selection algorithm for automated provisioning and management of the plurality of storage arrays based on information collected from the storage arrays and stored in the centralized database;

wherein the centralized database is implemented in a centralized storage provisioning and management system configured to control provisioning and management of the service provider storage systems utilizing information collected from the service provider storage systems, the centralized storage provisioning and management system being further configured to associate user identifiers with respective tenants of each of the service providers and to control user access to the storage systems associated with the different service providers in a manner that allows the centralized storage provisioning and management system to track resource usage;

the centralized storage provisioning and management system comprising a centralized control path implemented apart from the service provider storage systems and a plurality of localized control paths implemented in respective ones of the service provider storage systems; and the centralized storage provisioning and management system providing storage provisioning and management functionality for the different service providers in accordance with a software-as-a-service model in which the centralized storage provisioning and management system exclusively controls provisioning and management of the storage arrays associated with the respective service provider storage systems;

wherein the service provider storage systems offload local provisioning and management functionality to the centralized storage provisioning and management system; and wherein responsive to the storage arrays having different numbers of connections to one or more storage area network switches, the selection algorithm utilizes information relating to occupancy levels of the storage arrays and the numbers of connections to the storage area network switches to choose placement for new storage.

18. The computer program product of claim 17 wherein the one or more software programs when executed in information technology infrastructure further cause the information technology infrastructure:

to receive a request from a client for storage resources at a particular performance level;
to identify at least a subset of the storage arrays having storage resources available at the particular performance level;
to eliminate from consideration any of the identified storage arrays not accessible by the client;
to sort remaining identified storage arrays based on one or more designated utilization measures; and
to select one or more of the arrays based at least in part on a result of the sorting.

19. The computer program product of claim 18 wherein the one or more designated utilization measures comprise one or more of array utilization and storage area network utilization.

20. The computer program product of claim 17 wherein the one or more software programs when executed in information technology infrastructure further cause the information technology infrastructure:
- to receive a request from a client for storage resources;
- to reserve an amount of storage in one or more of the storage arrays as required to satisfy the request; and
- to automatically configure said one or more storage arrays to provide the reserved amount of storage at a scheduled time.

\* \* \* \* \*